(12) United States Patent
Hayashi et al.

(10) Patent No.: US 11,999,854 B2
(45) Date of Patent: Jun. 4, 2024

(54) RUBBER COMPOSITION

(71) Applicant: COMPAGNIE GENERALE DES ETABLISSEMENTS MICHELIN, Clermont-Ferrand (FR)

(72) Inventors: Tenko Hayashi, Tokyo (JP); Christine Nourry, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 17/606,392

(22) PCT Filed: Apr. 27, 2020

(86) PCT No.: PCT/JP2020/017908
§ 371 (c)(1),
(2) Date: Oct. 25, 2021

(87) PCT Pub. No.: WO2020/218601
PCT Pub. Date: Oct. 29, 2020

(65) Prior Publication Data
US 2022/0195154 A1 Jun. 23, 2022

(30) Foreign Application Priority Data
Apr. 25, 2019 (WO) .................. PCT/JP2019/017583

(51) Int. Cl.
*C08L 9/06* (2006.01)
*B60C 1/00* (2006.01)
*C08L 15/00* (2006.01)
*C08C 19/25* (2006.01)

(52) U.S. Cl.
CPC .............. *C08L 9/06* (2013.01); *B60C 1/0016* (2013.01); *C08L 15/00* (2013.01); *C08C 19/25* (2013.01); *C08L 2205/025* (2013.01); *C08L 2205/03* (2013.01)

(58) Field of Classification Search
CPC ...... C08L 9/06; C08L 15/00; C08L 2205/025; C08L 2205/00; B60C 1/0016
See application file for complete search history.

(56) References Cited

U.S. PATENT DOCUMENTS

| | | | |
|---|---|---|---|
| 6,013,718 A | 1/2000 | Cabioch et al. |
| 6,774,255 B1 | 8/2004 | Tardivat et al. |
| 6,849,754 B2 | 2/2005 | Deschler et al. |
| 7,217,751 B2 | 5/2007 | Durel et al. |
| 7,250,463 B2 | 7/2007 | Durel et al. |
| 7,300,970 B2 | 11/2007 | Durel et al. |
| 7,488,768 B2 | 2/2009 | Tardivat et al. |
| 7,491,767 B2 | 2/2009 | Durel et al. |
| 7,671,132 B1 | 3/2010 | Thielen et al. |
| 8,492,475 B2 | 7/2013 | Araujo Da Silva et al. |
| 8,957,155 B2 | 2/2015 | Seeboth et al. |
| 9,010,393 B2 | 4/2015 | Araujo Da Silva et al. |
| 9,175,124 B2 | 11/2015 | Chaboche et al. |
| 9,771,469 B2 | 9/2017 | Sandstrom et al. |
| 10,160,847 B2 | 12/2018 | Lesage et al. |
| 10,273,351 B2 | 4/2019 | Pavon Sierra et al. |
| 10,457,798 B2 | 10/2019 | Broemmel et al. |
| 10,487,195 B2 | 11/2019 | Haberkorn et al. |
| 10,570,275 B2 | 2/2020 | Broemmel et al. |
| 11,111,360 B2 | 9/2021 | Pawlak et al. |
| 11,124,631 B2 | 9/2021 | Maeda et al. |
| 11,241,912 B2 | 2/2022 | Watanabe et al. |
| 11,724,545 B2 | 8/2023 | Sakurada et al. |
| 2004/0051210 A1 | 3/2004 | Tardivat et al. |
| 2004/0129360 A1 | 7/2004 | Vidal |
| 2004/0132880 A1 | 7/2004 | Durel et al. |
| 2005/0004297 A1 | 1/2005 | Durel et al. |
| 2005/0016650 A1 | 1/2005 | Durel et al. |
| 2005/0016651 A1 | 1/2005 | Durel et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2010/0145089 A1 | 6/2010 | Mignani et al. |
| 2011/0152458 A1 | 6/2011 | Araujo Da Silva et al. |
| 2011/0178233 A1 | 7/2011 | Chaboche et al. |
| 2011/0294953 A1 | 12/2011 | Seeboth et al. |
| 2012/0123018 A1 | 5/2012 | Kanz et al. |

(Continued)

FOREIGN PATENT DOCUMENTS

| | | |
|---|---|---|
| CN | 109206694 A | 1/2019 |
| DE | 60225300 T2 | 2/2009 |

(Continued)

OTHER PUBLICATIONS

International Search Report dated Jun. 22, 2020, in corresponding PCT/JP2020/017908 (2 pages).

(Continued)

*Primary Examiner* — Doris L Lee
(74) *Attorney, Agent, or Firm* — VENABLE LLP

(57) ABSTRACT

A rubber composition is based on at least an elastomer matrix, a reinforcing filler comprising a reinforcing inorganic filler, and a plasticizing agent comprising a hydrocarbon resin and a liquid plasticizer comprising a vegetable oil and a liquid diene polymer bearing at least one silane function, wherein the amount in phr of hydrocarbon resin is higher than that of the liquid diene polymer, and wherein the amount in phr of vegetable oil is higher than one-third of the amount in phr of the liquid diene polymer.

18 Claims, No Drawings

(56) References Cited

U.S. PATENT DOCUMENTS

| | | | |
|---|---|---|---|
| 2013/0267640 A1* | 10/2013 | Lopez | B60C 1/0016 524/506 |
| 2013/0296471 A1 | 11/2013 | Lesage et al. | |
| 2014/0024745 A1 | 1/2014 | Vasseur et al. | |
| 2014/0243448 A1 | 8/2014 | Lesage et al. | |
| 2016/0376428 A1 | 12/2016 | Sandstrom et al. | |
| 2017/0051135 A1 | 2/2017 | Sandstrom et al. | |
| 2018/0100058 A1 | 4/2018 | Pavon Sierra et al. | |
| 2018/0118926 A1* | 5/2018 | Haberkorn | C08C 19/25 |
| 2019/0061425 A1 | 2/2019 | Broemmel et al. | |
| 2019/0062534 A1 | 2/2019 | Broemmel et al. | |
| 2019/0062535 A1 | 2/2019 | Broemmel et al. | |
| 2019/0194429 A1 | 6/2019 | Maeda et al. | |
| 2020/0056016 A1 | 2/2020 | Sakurada | |
| 2020/0101795 A1 | 4/2020 | Sakurada et al. | |
| 2020/0165419 A1 | 5/2020 | Pawlak et al. | |
| 2021/0101409 A1 | 4/2021 | Watanabe et al. | |
| 2022/0220288 A1 | 7/2022 | Hayashi et al. | |

FOREIGN PATENT DOCUMENTS

| | | |
|---|---|---|
| DE | 102015210422 A1 | 12/2016 |
| DE | 102015218745 A1 | 3/2017 |
| EP | 0778311 A1 | 6/1997 |
| EP | 1035164 A1 | 9/2000 |
| EP | 2285852 | 11/2009 |
| EP | 2204406 A1 | 7/2010 |
| EP | 2455232 A1 | 5/2012 |
| EP | 3294574 | 11/2016 |
| EP | 3 109 066 A1 | 12/2016 |
| EP | 3103655 A1 | 12/2016 |
| EP | 3303004 A1 | 12/2016 |
| EP | 2 532 309 * | 10/2017 |
| EP | 3 450 203 A1 | 3/2019 |
| EP | 3 450 206 A1 | 3/2019 |
| KR | 10-2014-0030706 A | 3/2014 |
| WO | 96/37547 A2 | 11/1996 |
| WO | 99/09036 A1 | 2/1999 |
| WO | 99/28380 A1 | 6/1999 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 2004/033548 A1 | 4/2004 |
| WO | 2006/023815 A2 | 3/2006 |
| WO | 2006/125532 A1 | 11/2006 |
| WO | 2006/125533 A1 | 11/2006 |
| WO | 2006/125534 A1 | 11/2006 |
| WO | 2007/098080 A2 | 8/2007 |
| WO | 2008/055986 A2 | 5/2008 |
| WO | 2010/072685 A1 | 7/2010 |
| WO | WO 2016/180649 * | 11/2016 |
| WO | 2018/079800 A1 | 5/2018 |
| WO | 2018/079802 A1 | 5/2018 |
| WO | 2018/079804 A1 | 5/2018 |
| WO | WO 2018/079801 * | 5/2018 |
| WO | 2018/182042 A1 | 10/2018 |
| WO | 2018/203002 A1 | 11/2018 |
| WO | 2018/221630 A1 | 12/2018 |
| WO | 2019/016885 A1 | 1/2019 |
| WO | 2018/043699 A1 | 6/2019 |

OTHER PUBLICATIONS

S. Brunauer, et al., "Adsorption of Gases in Multimolecular Layers", J. Am. Chem. Soc., vol. 60, pp. 309-319 (1938).

* cited by examiner

RUBBER COMPOSITION

TECHNICAL FIELD

The field of the invention is rubber compositions, for example, for a rubber article, particularly for tires, shoes or caterpillar tracks, more particularly for tires, still more particularly for tire treads.

BACKGROUND ART

In a known way (for example, the following patent literature 1), liquid diene polymers have been used in rubber compositions of rubber articles in order to improve the durability.

CITATION LIST

Patent Literature

[PTL 1]
EP1035164

However, the improvement by the liquid diene polymer can be disadvantageous to the hysteresis property of the rubber compositions, and thus a constant objective of the manufactures of the articles is improvement of balance of performances (the durability and the hysteresis property).

SUMMARY OF INVENTION

Technical Problem

During the research, the inventor has discovered a specific rubber composition which allows an unexpectedly improved balance of performances between the durability and the hysteresis property.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning calorimetry) according to Standard ASTM D3418-08.

Any interval of values denoted by the expression "between a and b" represents the range of values of more than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s), the product of the reaction of the various constituents used or both, some of the constituents being able or intended to react together, at least partly, during the various manufacturing phases of the composition, in particular during the vulcanization (curing).

Solution to Problem

A first aspect of the invention is a rubber composition based on at least an elastomer matrix, a reinforcing filler comprising a reinforcing inorganic filler; and a plasticizing agent comprising a hydrocarbon resin and a liquid plasticizer comprising a vegetable oil and a liquid diene polymer bearing at least one silane function, wherein the amount in phr of hydrocarbon resin is higher than that of the liquid diene polymer, and wherein the amount in phr of vegetable oil is higher than one-third of the amount in phr of the liquid diene polymer.

Advantageous Effects of Invention

The specific rubber composition allows improving the balance of performances between the durability and the hysteresis property.

Each of the below aspect(s), the embodiment(s) and the variant(s) including each of the preferred range(s), matter(s) or both may be applied to any one of the other aspect(s), the other embodiment(s) and the other variant(s) of the invention unless expressly stated otherwise.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (molar %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of rubber articles (for example, tires) will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

According to a preferred embodiment of the invention, the elastomer matrix comprises at least one diene elastomer selected from the group consisting of polybutadiene(s) (BR(s)), natural rubber (NR), synthetic polyisoprene(s) (IR(s)), butadiene copolymer(s), isoprene copolymer(s) and the combinations thereof, such copolymers are selected more preferably from the group consisting of styrene-butadiene copolymer(s) (SBR(s)) and the combinations thereof.

A second aspect of the invention is the rubber composition according to the first aspect, wherein the elastomer matrix comprises at least one first diene elastomer bearing at least one SiOR function, R being hydrogen atom or a hydrocarbon radical, preferably R being a hydrocarbon radical.

The hydrocarbon radical may be an alkyl radical, preferably an alkyl radical having 1 to 12 carbon atoms, more preferably a branched, linear or else cyclic alkyl radical having 1 to 12 carbon atoms, still more preferably 1 to 6 carbon atoms, particularly 1 to 4 carbon atoms, more particularly methyl or ethyl radical(s).

According to a preferred embodiment of the second aspect, the first diene elastomer is selected from the group consisting of polybutadiene(s) (BR(s)), synthetic polyisoprene(s) (IR(s)), natural rubber (NR), butadiene copolymer(s), isoprene copolymer(s) and the combinations thereof. Such copolymer(s) is selected more preferably from the group consisting of styrene-butadiene copolymer(s) (SBR(s)) and the combinations thereof.

According to a preferred embodiment of the second aspect, the first diene elastomer may have any microstructure which depends on the polymerization conditions used, in particular on the presence or absence of a modifying agent, a randomizing agent or both and on the amounts of modifying agent, randomizing agent employed or both. This elastomer may, for example, be a block, statistical, sequential or micro sequential elastomer and may be prepared in dispersion or in solution.

The expression "hydrocarbon radical" means a monovalent group essentially consisting of carbon and hydrogen atoms. Such a group may comprise at least one heteroatom, and it is known that the assembly formed by the carbon and hydrogen atoms represents the major number fraction in the hydrocarbon radical, for example alkyl or alkoxyalkyl; preferably assembly formed by the carbon and hydrogen atoms represents the entirety of the hydrocarbon radical(s), for example alkyl. Such a SiOR (R is alkyl or alkoxyalkyl) is referred as an "alkoxysilane" function. While, a SiOH (R is a hydrogen atom) is referred as a "silanol" function.

Generally, a function borne by an elastomer, particularly a diene elastomer, may be located on the elastomer chain end(s) or may not be located at the elastomer chain ends, that is, may be away from the chain ends. The first case occurs for example when the diene elastomer is prepared using a polymerization initiator bearing the function or using a functionalizing agent. The second case occurs for example when the diene elastomer is modified by the use of a coupling agent or star-branching agent bearing the function.

A third aspect of the invention is the rubber composition according to the second aspect, wherein the first diene elastomer is a styrene-butadiene copolymer (SBR), preferably a solution styrene-butadiene copolymer which is a copolymer of styrene and butadiene, prepared in solution.

According to a preferred embodiment of the second aspect or the third aspect, the SiOR function is located at the chain end of the first diene elastomer.

According to a more preferred embodiment of the preferred embodiment, the first diene elastomer bearing the SiOR function located at the chain end is prepared according to the procedure described in a patent EP 0 778 311 B1, for example by reaction of the carbanion at the end of the living elastomeric chain with hexamethylcyclotrisiloxane followed by reaction with a proton donor.

According to another preferred embodiment of the second aspect or the third aspect, the SiOR function is not located at the chain ends of the first diene elastomer.

According to a first variant of the other preferred embodiment, the SiOR function borne by the first diene elastomer is a pendant group, which is equivalent to saying that the silicon atom of the SiOR function may not be inserted between the carbon-carbon bonds of the elastomer chain of the first diene elastomer. A diene elastomer bearing a pendant SiOR function may for example be prepared by hydrosilylation of the elastomer chain by a silane bearing an alkoxysilane group, followed by hydrolysis of the alkoxysilane function to give a SiOR function.

According to a second variant of the other preferred embodiment, the SiOR function borne by the first diene elastomer may not be a pendant group, but may be situated in the elastomer chain, that is, may be within the elastomer chain, which is equivalent to saying that the silicon atom of the SiOR function may be inserted between the carbon-carbon bonds of the elastomer chain of the first diene elastomer. Such a diene elastomer may be prepared according to the procedure described in a patent EP 2 285 852 B1. This second variant is preferential and applies to the other preferred embodiment.

According to a still more preferred embodiment of the second aspect, the third aspect, the preferred embodiment or the more preferred embodiment, the first diene elastomer further bears at least one amine function, preferably at least one tertiary amine function.

According to a particular embodiment of the still more preferred embodiment, the amine function borne by the first diene elastomer is a tertiary amine function. Mention will be made, as tertiary amine function, of the amines substituted with $C_1$-$C_{10}$ alkyl radicals, preferably $C_1$-$C_4$ alkyl, more preferably methyl or ethyl radical(s).

According to a more particular embodiment of the particular embodiment, the amine function borne by the first diene elastomer is a pendant group. The pendant position of the amine function means, in a known way, that the nitrogen atom of the amine function is not inserted between the carbon-carbon bonds of the elastomer chain of the first diene elastomer.

According to another more particular embodiment of the particular embodiment, the first diene elastomer is such that the SiOR function bears the amine function. Such a diene elastomer may result from the modification of a diene elastomer by a coupling agent that introduces, the elastomer chain, an alkoxysilane group bearing an amine function according to the operating procedure described in a patent EP 2 285 852 B1. The following are suitable for example as coupling agent: N,N-dialkylaminopropyltrialkoxysilanes, $C_1$-$C_{10}$, preferably $C_1$-$C_4$, dialkyl groups, the compounds 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane being most particularly preferred, irrespective of the embodiment of the invention.

According to a still more particular embodiment of the second aspect, the third aspect, the preferred embodiment, the more preferred embodiment, the still more preferred embodiment, the particular embodiment or the more particular embodiment, the first diene elastomer has a glass transition temperature ($Tg_{DSC}$) of lower than −40° C., (notably between −100° C. and −40° C.), advantageously less than −45° C. (notably between −90° C. and −45° C.).

According to an advantageous embodiment of the second aspect, the third aspect, the preferred embodiment, the more preferred embodiment, the still more preferred embodiment, the particular embodiment, the more particular embodiment or the still more particular embodiment, the elastomer matrix optionally comprises at least one second diene elastomer different from the first diene elastomer, that is, the elastomer matrix does not comprise any second diene elastomer different from the first diene elastomer, or the elastomer matrix further comprises at least one second diene elastomer different from the first diene elastomer, and wherein the amount of the first diene elastomer is from 20 to 100 phr, preferably between 50 and 100 phr, more preferably from 55 to 95 phr, still more preferably from 60 to 90 phr, particularly from 65 to 85 phr, and wherein the amount of the second diene elastomer is 0 to 80 phr, preferably between 0 and 50 phr, more preferably from 5 to 45 phr, still more preferably from 10 to 40 phr, particularly from 15 to 35 phr.

According to a more advantageous embodiment of the advantageous embodiment, the second diene elastomer is selected from the group consisting of polybutadienes, natural rubber, synthetic polyisoprenes, butadiene copolymers, isoprene copolymers and the combinations thereof, preferably selected from the group consisting of polybutadienes and the combinations thereof.

The rubber composition according to the invention is based on a reinforcing filler.

Use may be made of any type of reinforcing filler known for its capabilities of reinforcing a rubber composition which can be used for the manufacture of rubber articles, for example a reinforcing organic filler, such as carbon black, or a reinforcing inorganic filler, such as silica, with which a coupling agent is combined in a known way.

According to a preferred embodiment of the invention, the amount of the reinforcing filler is more than 95 phr (for example, between 95 and 315 phr), preferably more than 105 phr (for example, between 105 and 295 phr), more preferably more than 115 phr (for example, between 115 and 275 phr), still more preferably more than 125 phr (for example, between 125 and 255 phr), particularly more than 135 phr (for example, between 135 and 235 phr), more particularly more than 145 phr (for example, between 145 and 215 phr), still more particularly more than 155 phr (for example, between 155 and 195 phr), advantageously more than 165 phr (for example, between 165 and 175 phr).

The reinforcing filler in the rubber composition according to the invention comprises a reinforcing inorganic filler, preferably the reinforcing filler predominately comprises the reinforcing inorganic filler, that is, the reinforcing filler comprises more than 50%, more preferably more than 60%, still more preferably more than 70%, particularly more than 80%, more particularly more than 90%, by weight of the reinforcing inorganic filler per 100% by weight of the reinforcing filler.

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of rubber articles (for example, tires), in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the combinations of various reinforcing inorganic fillers, preferably of highly dispersible siliceous fillers, aluminous fillers or both is described hereafter.

Mineral fillers of the siliceous type (preferably silica ($SiO_2$)), the aluminous type (preferably alumina ($Al_2O_3$)) or both are suitable in particular as the reinforcing inorganic fillers.

A fourth aspect of the invention is the rubber composition according to any one of the first to the third aspects, wherein the amount of the reinforcing inorganic filler is more than 90 phr (for example, between 90 and 310 phr), preferably more than 100 phr (for example, between 100 and 290 phr), more preferably more than 110 phr (for example, between 110 and 270 phr), still more preferably more than 120 phr (for example, between 120 and 250 phr), particularly more than 130 phr (for example, between 130 and 230 phr), more particularly more than 140 phr (for example, between 140 and 210 phr), still more particularly more than 150 phr (for example, between 150 and 190 phr), advantageously more than 160 phr (for example, between 160 and 170 phr).

A fifth aspect of the invention is the rubber composition according to any one of the first to the fourth aspects, wherein the reinforcing inorganic filler predominately comprises silica, that is, the reinforcing inorganic filler comprises more than 50%, preferably more than 75%, more preferably 100%, by weight of silica per 100% by weight of the reinforcing inorganic filler. The reinforcing inorganic filler may comprise a type of silica or a blend of several silicas. The silica used may be any reinforcing silica known to a person skilled in the art, in particular any precipitated or pyrogenic silica having a BET surface area and a CTAB specific surface area that are both less than 450 $m^2/g$, preferably from 20 to 400 $m^2/g$, more preferably from 50 to 350 $m^2/g$, still more preferably from 100 to 300 $m^2/g$, particularly from 150 to 250 $m^2/g$. Such silica may be covered or not.

The BET surface area is measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B).

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for rubber articles (for example, tires), such as described in patent applications WO 96/37547 and WO 99/28380.

A sixth aspect of the invention is the rubber composition according to any one of the first to the fifth aspects, wherein the reinforcing filler further comprises carbon black, and wherein the amount of carbon black is less than 10 phr (for example, between 0 and 10 phr), preferably less than 9 phr (for example, between 1 and 9 phr), more preferably less than 8 phr (for example, between 2 and 8 phr).

Within the ranges indicated, there is a benefit of coloring properties (black pigmentation agent) and anti-UV properties of carbon blacks, without furthermore adversely affecting the typical performance provided by the reinforcing inorganic filler, namely low hysteresis (reduced rolling resistance) and high grip on wet.

In order to couple the reinforcing inorganic filler to the elastomer matrix, for instance, the diene elastomer, use can be made, in a known manner, of a coupling agent (or bonding agent) intended to provide a satisfactory connection, of chemical nature, physical nature or both, between the reinforcing inorganic filler (surface of its particles) and the elastomer matrix, for instance, the diene elastomer. This coupling agent is at least bifunctional. Use can be made in particular of at least bifunctional organosilanes or polyorganosiloxanes.

Use can be made in particular of silane polysulfides, referred to as "symmetrical" or "asymmetrical" depending on their particular structure, as described, for example, in applications WO 03/002648, WO 03/002649 and WO 2004/033548.

Particularly suitable silane polysulfides correspond to the following general formula (I):

(I) Z-A-Sx-A-Z , in which:

x is an integer from 2 to 8 (preferably from 2 to 5);

A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

[Chem. 1]

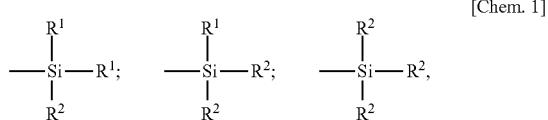

in which:
the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl, ethyl or both), the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulfides corresponding to the above formula (I), in particular normal commercially available combinations, the mean value of the "x" indices is a fractional number preferably of between 2 and 5, more preferably of approximately 4. However, the present invention can also advantageously be carried out, for example, with alkoxysilane disulfides (x=2).

Mention will more particularly be made, as examples of silane polysulfides, of bis(($C_1$-$C_4$)alkoxyl($C_1$-$C_4$)alkylsilyl ($C_1$-$C_4$)alkyl)polysulfides (in particular disulfides, trisulfides or tetrasulfides), such as, for example, bis(3-trimethoxysilylpropyl) or bis(3-triethoxysilylpropyl)polysulfides. Use is in particular made, among these compounds, of bis(3-triethoxysilylpropyl)tetrasulfide, abbreviated to TESPT, of formula $[(C_2H_5O)_3Si(CH_2)_3S_2]_2$, or bis(3-triethoxysilylpropyl)disulfide, abbreviated to TESPD, of formula $[(C_2HSO)_3Si(CH_2)_3S]_2$. Mention will also be made, as preferred examples, of bis(mono($C_1$-$C_4$)alkoxyldi($C_1$-$C_4$)alkyl silylpropyl)polysulfides (in particular disulfides, trisulfides or tetrasulfides), more particularly bis(monoethoxydimethylsilylpropyl)tetrasulfide, as described in patent application WO 02/083782 (or U.S. Pat. No. 7,217,751).

Mention will in particular be made, as coupling agent other than alkoxysilane polysulfide, of bifunctional POSs (polyorganosiloxanes) or of hydroxysilane polysulfides ($R^2$=OH in the above formula (I)), such as described in patent applications WO 02/30939 (or U.S. Pat. No. 6,774,255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulfides, mention will be made, for example, of the silanes bearing at least one thiol (—SH) function (referred to as mercaptosilanes), at least one blocked thiol function or both, such as described, for example, in patents or patent applications U.S. Pat. No. 6,849,754, WO 99/09036, WO 2006/023815, WO 2007/098080, WO 2008/055986 and WO 2010/072685.

Of course, use could also be made of combinations of the coupling agents described previously, as described in particular in the aforementioned patent application WO 2006/125534.

According to a preferred embodiment of the invention, the content of coupling agent is from 0.5 to 15% by weight per 100% by weight of the reinforcing inorganic filler, particularly silica.

According to a preferred embodiment of the invention, the rubber composition of the tread of the rubber composition according to the invention is based on less than 50 phr (for example, between 0 and 50 phr), preferably less than 40 phr (for example, between 1 and 40 phr), more preferably more less than 30 phr (for example, between 2 and 30 phr), of coupling agent.

The rubber composition according to the invention is based on a plasticizing agent.

The role of the plasticizing agent is to soften the matrix by diluting the elastomer and the reinforcing filler.

According to a preferred embodiment of the invention, the amount of the plasticizing agent is more than 45 phr (for example, between 45 and 205 phr), preferably more than 55 phr (for example, between 55 and 195 phr), more preferably more than 65 phr (for example, between 65 and 185 phr), still more preferably more than 75 phr (for example, between 75 and 175 phr), particularly more than 85 phr (for example, between 85 and 165 phr), particularly more than 95 phr (for example, between 95 and 155 phr), more particularly more than 105 phr (for example, between 105 and 145 phr), still more particularly more than 115 phr (for example, between 115 and 135 phr).

The plasticizing agent in the rubber composition according to the invention comprises the liquid plasticizer.

The liquid plasticizer is liquid at 20° C. by definition, and its $Tg_{DSC}$ is by definition less than −20° C., preferably less than −30° C., more preferably less than −40° C.

Any extending oil, whether of aromatic or non-aromatic nature, any liquid plasticizing agent known for its plasticizing properties with regard to elastomer matrix(es) (for instance, diene elastomer), can be used as the liquid plasticizer. At ambient temperature (20° C.) under atmospheric pressure, these plasticizers or these oils, which are more or less viscous, are liquids (that is to say, as a reminder, substances that have the ability to eventually take on the shape of their container), as opposite to plasticizing hydrocarbon resin(s) which are by nature solid at ambient temperature (20° C.) under atmospheric pressure.

According to a preferred embodiment of the invention, the amount of the liquid plasticizer is more than 10 phr (for example, between 10 and 90 phr), preferably more than 20 phr (for example, between 20 and 80 phr), more preferably more than 30 phr (for example, between 30 and 70 phr), still more preferably more than 40 phr (for example, between 40 and 60 phr).

The liquid plasticizer in the plasticizing agent in the rubber composition according to the invention comprises a liquid diene polymer.

The liquid diene polymer is a diene polymer, and is liquid at 20° C. by definition.

A seventh aspect of the invention is the rubber composition according to any one of the first to the sixth aspects, wherein the amount of the liquid diene polymer is at most 25 phr (for example, from 1 to 25 phr), preferably at most 20 phr (for example, from 3 to 20 phr), more preferably at most 15 phr (from 5 to 15 phr).

An eighth aspect of the invention is the rubber composition according to any one of the first to the seventh aspects, wherein the liquid diene polymer has a glass transition temperature of less than −60° C. (for example, between −100° C. and −60° C.), preferably less than −65° C. (for example, between −95° C. and −65° C.), more preferably less than −70° C. (for example, between −90° C. and −70° C.), still more preferably less than −75° C. (for example, between −85° C. and −75° C.).

According to a preferred embodiment of the invention, the liquid diene polymer has a number average molar mass of less than 25000 g/mol, preferably less than 20000 g/mol, more preferably less than 15000 g/mol, still more preferably less than 10000 g/mol. A ninth aspect of the invention is the rubber composition according to any one of the first to eighth aspects, wherein the liquid diene polymer has a number average molar mass of less than 6000 g/mol (for example, between 500 and 6000 g/mol), preferably less than 5500 g/mol (for example, between 1000 and 5500 g/mol), more preferably less than 5000 g/mol (for example, between 1500 and 5000 g/mol), still more preferably less than 4000 g/mol (for example, between 2000 and 4000 g/mol).

The number average molar mass (Mn) can be measured by gel permeation chromatography (GPC).

In case of gel permeation chromatography (GPC) of hydroxyl-terminated polybutadienes: The measurements can be carried out at 40° C. in tetrahydrofuran (THF) at a concentration of 1 g/L and a flow rate of 0.3 ml/min. Chromatographic separation can be achieved using a PSS SDV Micro 5μ/4.6×30 mm precolumn and a PSS SDV Micro linear S 5μ/4.6×250 mm (2×) separation column. Detection can be by means of an RI detector. Calibration can be carried out by means of a polybutadiene standard (PSS-Kit polybutadiene-1,4, Mp 83 1-106000, Part No.:PSS-bdfkit, Mn: 1830/4330/9300/18000/33500).

In cast of gel permeation chromatography (GPC) of silane terminated polybutadienes: The measurements can be carried out at room temperature in tetrahydrofuran (THF) at a concentration of 5 g/L and a flow rate of 1 ml/min. Chromatographic separation can be effected using a combination of styrene-divinylbenzene columns (2×3 cm, 5 μn, linear; 1×30 cm 5 μm, 100 Å). Detection can be by means of an RI detector. Calibration can be carried out by means of polystyrene standards and absolute molecular weights obtained via Mark-Houwink constants (a=0.73; k=0.0266 ml/g).

According to a preferred embodiment of the invention, the liquid diene polymer is selected from the group consisting of liquid polybutadiene(s), liquid polyisoprene(s), liquid styrene-butadiene copolymer(s), and the combinations thereof.

According to a more preferred embodiment of the preferred embodiment, the liquid diene polymer is preferably selected from the group consisting of liquid polybutadiene(s), liquid polyisoprene(s), and the combinations thereof.

According to another more preferred embodiment of the preferred embodiment, the liquid diene polymer is preferably selected from the group consisting of liquid polybutadiene(s), liquid styrene-butadiene copolymer(s), and the combinations thereof.

A tenth aspect of the invention is the rubber composition according to any one of the first to ninth aspects, wherein the liquid diene polymer comprises the 1,3-butadiene derived monomer units being 1,2-vinyl, 1,4-trans and 1,4-cis, and wherein the proportion of 1,2-vinyl in the entirety of the 1,3-butadiene derived monomer units present in the liquid diene polymer is less than 40 mol % (for example, between 0 and 40 mol %), preferably less than 35 mol % (for example, between 5 and 35 mol %), more preferably less than 30 mol % (for example, between 10 and 30 mol %), and wherein the sum of the proportions of 1,4-trans and 1,4-cis in the entirety of the 1,3-butadiene derived monomer units present in the liquid diene polymer is more than 60 mol % (for example, between 60 and 100 mol %), preferably more than 65 mol % (for example, between 65 and 95 mol %), more preferably more than 70 mol % (between 70 and 90 mol %).

According to a preferred embodiment of the tenth aspect, wherein the proportion of 1,4-trans in the entirety of the 1,3-butadiene derived monomer units present in the liquid diene polymer is more than 30 mol % (for example, between 30 and 90 mol %), preferably more than 35 mol % (for example, between 35 and 85 mol %), more preferably more than 40% (for example, between 40 and 80 mol %), still more preferably more than 45% (for example, between 45 and 75 mol %), particularly more than 50 mol % (for example, between 50 and 70 mol %).

The features of the above microstructure (1,2-vinyl content; 1,4-cis content; and 1,4-trans content) can be determined after completion of synthesis of the liquid diene polymer by nuclear magnetic resonance (NMR) with $^1$H, $^{13}$C or the both, for example, $^{13}$C NMR (90.5628 MHz; relaxation agent: Cr (acac)3; solvent: deuterated chloroform ($CDC_{13}$), Bruker 360 MHz).

An eleventh aspect of the invention is the rubber composition according to any one of the first to the tenth aspects, wherein the liquid diene polymer is a liquid polybutadiene.

According to a preferred embodiment of the eleventh aspect, the term "liquid polybutadiene" as used herein is to be understood as meaning a product obtainable by polymerization of monomer units each having at least two conjugated double bonds, wherein in order of increasing preference, at least 80, 85, 90, 95, 98, 99 or 99.9% of the monomer units are 1,3-butadiene.

The liquid diene polymer in the liquid plasticizer in the plasticizing agent in the rubber composition according to the invention bears at least one silane function.

The liquid diene polymer herein described bears at least one function that comprises at least one function selected from the group consisting of silane function(s), hydroxyl function(s), anhydride function(s) (for example, maleic anhydride functions), and the combinations thereof.

According to a preferred embodiment of the invention, the liquid diene polymer has an average functionality of more than 1.0 (for example, between 1.0 and 4.0), preferably at least 2.0 (from 2.0 to 3.0). The average functionality can be calculated via the number average molar mass (Mn) of the liquid diene polymer and the function number (for example, the number of silane groups, the number of hydroxyl groups, and the number of anhydride groups).

The function herein described comprises at least one function selected from the group consisting of silane function(s), hydroxyl function(s), and the combinations thereof.

According to a preferred embodiment of the invention, the liquid diene polymer is a liquid diene polymer produced by free-radical polymerization.

The liquid diene polymer herein described is a liquid polybutadiene that comprises at least one hydroxyl function produced by polymerization of 1,3-butadiene in the presence of peroxide, water and an organic solvent, preferably the liquid polybutadiene is a hydroxyl-terminated liquid polybutadiene, as described in EP12169794.

According to a more preferred embodiment of the preferred embodiment, the liquid diene polymer a liquid polybutadiene that comprises at least one silane function produced by reacting at least one organosilane compound (preferably, 3-isocyanatopropyltrimethoxy silane, isocyanatopropyltriethoxysilane or the combinations thereof) with the liquid polybutadiene comprising at least one hydroxyl function (preferably, a hydroxyl-terminated liquid polybutadiene), preferably a triethoxysilane-terminated liquid polybutadiene, as described in EP3294574.

In the present invention, the liquid diene polymer bears the function that is a silane function(s).

The liquid plasticizer in the plasticizing agent in the rubber composition according to the invention comprises a vegetable oil, and the amount in phr of vegetable oil is higher than one-third of the amount in phr of the liquid diene polymer.

The vegetable oil is an oil derived from vegetable(s), and is liquid at 20° C. by definition.

According to a preferred embodiment of the invention, the amount in phr of vegetable oil is higher than that of the liquid diene polymer, preferably the amount in phr of vegetable oil is higher than twice of the amount in phr of the liquid diene polymer.

A twelfth aspect of the invention is the rubber composition according to any one of the first to the eleventh aspects, wherein the amount of the vegetable oil is more than 5 phr (for example, between 5 and 65 phr), preferably more than 10 phr (for example, between 10 and 60 phr), more preferably more than 15 phr (for example, between 15 and 55 phr), still more preferably more than 20 phr (for example, between 20 and 50 phr), particularly more than 25 phr (for example, between 25 and 45 phr), more particularly more than 30 phr (for example, between 30 and 40 phr).

A thirteenth aspect of the invention is the rubber composition according to any one of the first to the twelfth aspects, wherein the vegetable oil is selected from the group consisting of linseed oil, safflower oil, soybean oil, corn oil, cottonseed oil, turnip seed oil, castor oil, tung oil, pine oil, sunflower oil, palm oil, olive oil, coconut oil, groundnut oil, grapeseed oil, and the combinations thereof, preferably selected from the group consisting of sunflower oil and the combinations thereof, more preferably sunflower oil(s) containing over 60%, still preferably more over 70%, particularly over 80%, more particularly over 90%, still more particularly 100%, by weight of oleic acid.

According to a preferred embodiment of the invention, the liquid plasticizer optionally comprises at least one liquid plasticizer other than the liquid diene polymer or the vegetable oil, that is, the liquid plasticizer does not comprise any liquid plasticizer other than the liquid diene polymer, or comprises at least one liquid plasticizer other than the liquid diene polymer.

According to a more preferred embodiment of the preferred embodiment, the amount in phr of liquid plasticizer other than the liquid diene polymer or the vegetable oil is lower than that of the liquid diene polymer.

According to a more preferred embodiment of the preferred embodiment, the amount in phr of liquid plasticizer other than the liquid diene polymer or the vegetable oil is lower than that of the vegetable oil.

According to a more preferred embodiment of the preferred embodiment, the liquid plasticizer other than the liquid diene polymer is selected from the group consisting of liquid diene polymer(s) not bearing any function, polyolefinic oil(s), naphthenic oil(s), paraffinic oil(s), Distillate Aromatic Extracts (DAE) oil(s), Medium Extracted Solvates (MES) oil(s), Treated Distillate Aromatic Extracts (TDAE) oil(s), Residual Aromatic Extracts (RAE) oil(s), Treated Residual Aromatic Extracts (TRAE) oil(s), Safety Residual Aromatic Extracts (SRAE) oil(s), mineral oil(s), ether plasticizer(s), ester plasticizer(s), phosphate plasticizer(s), sulfonate plasticizer(s) and the combinations thereof, preferably selected from the group consisting of MES oils, TDAE oils, naphthenic oils and the combinations thereof, more preferably selected from the group consisting of MES oils, TDAE oils and the combinations thereof.

The plasticizing agent in the rubber composition according to the invention comprises a hydrocarbon resin, and the amount in phr of hydrocarbon resin is higher than that of the liquid diene polymer.

According to a preferred embodiment of the invention, the amount in phr of hydrocarbon resin is higher than twice of the amount in phr of the liquid diene polymer, preferably the amount in phr of hydrocarbon resin is higher than triple of the amount in phr of the liquid diene polymer.

A fourteenth aspect of the invention is the rubber composition according to any one of the first to the thirteenth aspects, wherein the amount of the hydrocarbon resin is more than 10 phr (for example, between 10 and 150 phr), preferably more than 15 phr (for example, between 15 and 145 phr), more preferably more than 20 phr (for example, between 20 and 140 phr), still more preferably more than 25 phr (for example, between 24 and 135 phr), particularly more than 30 phr (for example, between 30 and 130 phr), more particularly more than 35 phr (for example, between 35 and 125 phr), still more particularly more than 40 phr (for example, between 40 and 120 phr), advantageously more than 45 phr (for example, between 45 and 115 phr), more advantageously more than 50 phr (for example, between 50 and 110 phr), still more advantageously more than 55 phr (for example, between 55 and 105 phr), especially more than 60 phr (for example, between 60 and 100 phr), more especially more than 65 phr (for example, between 65 and 95 phr), still more especially more than 70 phr (for example, between 70 and 90 phr).

A fifteenth aspect of the invention is the rubber composition according to any one of the first to the fourteenth aspects, wherein the amount in phr of the hydrocarbon resin is higher than that of the vegetable oil.

A sixteenth aspect of the invention is the rubber composition according to any one of the first to the fifteenth aspects, wherein the amount in phr of the hydrocarbon resin is higher than the total amount in phr of the vegetable oil and the liquid polymer.

According to a preferred embodiment of the invention, the amount in phr of hydrocarbon resin is higher than the total amount in phr of the liquid plasticizer.

The hydrocarbon resin(s) are polymer well known by a person skilled in the art, which are essentially based on carbon and hydrogen, and thus miscible by nature in rubber composition(s), for instance, diene elastomer composition(s). They can be aliphatic or aromatic or also of the aliphatic/aromatic type, that is to say based on aliphatic monomers, aromatic monomers or both. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resins as being "plasticizing" exhibit at least one, more preferably all, of the following characteristics:

- a $Tg_{DSC}$ of above 20° C. (for example between 20° C. and 100° C.), preferably above 30° C. (for example between 30° C. and 100° C.), more preferably above 40° C. (for example between 40° C. and 100° C.);
- a number-average molecular weight (Mn) of between 400 and 2000 g/mol (more preferably between 500 and 1500 g/mol);
- a polydispersity index (PI) of less than 3, more preferably less than 2 (reminder: PI=Mw/Mn with Mw the weight-average molecular weight).

The macrostructure (Mw, Mn and PI) of the hydrocarbon resins is determined by steric exclusion chromatography (SEC): solvent tetrahydrofuran; temperature 35 ; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

A seventeenth aspect of the invention is the rubber composition according to any one of the first to the sixteenth aspects, the hydrocarbon resin is selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the combinations thereof. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinyl-aromatic copolymer resins, $C_9$ fraction/vinylaromatic copolymer resins, and the combinations thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyl)styrene, methoxystyrenes, chlorostyrenes, hydroxystyrenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

Mention may also be made, as examples of other preferred resins, of phenol-modified α-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially.

The rubber compositions according to the invention may be based on all or a portion(s) of the usual additives generally used in the elastomer compositions intended in particular for rubber articles (for example, tires, shoes or caterpillar tracks), in more particular for tires, in still more particular for tire treads, such as, for example, protection agents, such as antiozone waxes, chemical antiozonants, antioxidants, reinforcing resins, methylene acceptors (for example phenolic novolak resin) or methylene donors (for example hexamethylenetetramine (HMT) or hexamethoxymethylmelamine (H3M)), a crosslinking system based either on sulfur, donors of sulfur, peroxide, bismaleimides, vulcanization accelerators, vulcanization activators or both.

The composition can be also based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

The rubber composition according to the invention may be manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of such compositions comprises, for example and preferably, the following steps:

incorporating in the elastomer matrix, for instance, the diene elastomer(s), in a mixer, the reinforcing filler, the plasticizing agent during a first stage ("non-productive" stage) everything being kneaded thermomechanically (for example in one or more steps) until a maximum temperature of between 110° C. and 190° C. is reached;

cooling the combined mixture to a temperature of less than 100° C.;

subsequently incorporating, during a second stage (referred to as a "productive" stage), a crosslinking system;

kneading everything up to a maximum temperature of less than 110° C.;

extruding or calendering the rubber composition thus obtained, in particular in the form of a tire tread.

According to a preferred embodiment of the invention, the first (non-productive) phase is carried out in a single thermomechanical stage during which all the necessary constituents may be introduced into an appropriate mixer, such as a standard internal mixer, followed, in a second step, for example after kneading for 1 to 2 minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system may be then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system is preferably based on sulfur and on a primary vulcanization accelerator, in particular on an accelerator of sulfenamide type. Added to this vulcanization system are various known secondary accelerators or vulcanization activators, such as zinc oxide, stearic acid, guanidine derivatives (in particular diphenylguanidine), and the like, incorporated during the first non-productive phase, during the productive phase or both. The content of sulfur is preferably between 0.5 and 10.0 phr, more preferably between 0.5 and 3.0 phr, and that of the primary accelerator is preferably between 0.5 and 5.0 phr.

Use may be made, as accelerator (primary or secondary) of any compound capable of acting as accelerator of the vulcanization of elastomer matrix, for instance, diene elastomers, in the presence of sulfur, in particular accelerators of the thiazoles type and their derivatives, accelerators of thiurams types, or zinc dithiocarbamates. These accelerators are more preferably selected from the group consisting of 2-mercaptobenzothiazyl disulfide (abbreviated to "MBTS"), N-cyclohexyl-2-benzothiazole sulfenamide (abbreviated to "CBS"), N,N-dicyclohexyl-2 benzothiazolesulfenamide ("DCBS"), N-tert-butyl-2-benzothiazolesulfenamide ("TBBS"), N-tert-butyl-2 benzothiazolesulfenimide ("TBSI"), zinc dibenzyldithiocarbamate ("ZBEC"), Tetrabenzylthiuram disulfide ("TBZTD") and the combinations thereof.

The final composition thus obtained is subsequently calendered, for example in the form of a sheet or of a plaque, in particular for laboratory characterization, or else extruded in the form of a rubber profiled element which can be used directly as a laminate or an article, for example, a tire tread, a shoe sole and a caterpillar track tread.

The vulcanization (or curing) is carried out in a known way at a temperature generally of between 110° C. and 190° C. for a sufficient time which may vary, for example, between 5 and 90 min depending in particular on the curing temperature, the vulcanization system adopted and the vulcanization kinetics of the composition under consideration.

According to a preferred embodiment of the invention, an article comprises a rubber composition according to any one of the first to the seventeenth aspects.

According to a more preferred embodiment of the above preferred embodiment, the article is a tire, a shoe, a conveyor or a caterpillar track, for example, a tire tread, a shoe sole, a conveyor belt and a caterpillar track tread.

According to a still more preferred embodiment of the above more preferred embodiment, the article is a tire, preferably a tire in which the rubber composition according to any one of the first to the seventeenth aspects is comprised in its tread, sidewall(s) or the both.

The tires of the invention are particularly intended to equip passenger motor vehicles, including 4×4 (four-wheel drive) vehicles and SUV (Sport Utility Vehicles) vehicles, and industrial vehicles particularly selected from vans and heavy-duty vehicles (i.e., bus or heavy road transport vehicles (lorries, tractors, trailers)).

An eighteenth aspect of the invention is a tire tread comprising a rubber composition according to any one of the first to the seventeenth aspects.

According to a preferred embodiment of the eighteenth aspect, the tire tread comprising at least two radially superposed portions which comprises a radially external portion and a radially internal portion, the radially external portion intended to come into contact with the ground, the radially external portion being made of a first rubber composition, and the radially internal portion being made of a second rubber composition different from the first rubber composition.

According to a more preferred embodiment of the preferred embodiment, the first rubber composition is a rubber composition any one of the first to the seventeenth aspects.

According to another more preferred embodiment of the preferred embodiment, the second rubber composition is a rubber composition any one of the first to the seventeenth aspects.

According to an embodiment of the other more preferred embodiment, the radially external portion is intended to come into contact with the ground during service life of the tire.

According to another embodiment of the other more preferred embodiment, the radially external portion is not intended to come into contact with the ground during service life of the tire.

A radial direction is defined as a direction perpendicular to the axis of rotation of the tire, and the expression "radially" means "in radial direction". The expressions "radially on the inside (radially inner or radially internal), or respectively radially on the outside (radially outer or radially external)" mean "closer or, respectively, further away, from the axis of rotation of the tire, in the radial direction, than".

The service life of the tire means the duration to use the tire (for example, the term from the new state to the final state of the tire, the final state means a state on reaching the wear indicator bar(s) in the tread of tire).

The invention relates to the rubber compositions in the raw state (i.e., before curing) and in the cured state (i.e., after crosslinking or vulcanization).

The invention is further illustrated by the following non-limiting examples.

EXAMPLE

In order to confirm the effect of the invention, six rubber compositions (identified as C-1 and C-2 (references), C-3 and C-4 (examples according to the invention), C-5 and C-6 (comparative examples)) are compared for tear strength index (as an index of durability after curing) and tan(δ)max (as an index of hysteresis property after curing). They are based on a blend of BR and SBR bearing a SiOR function (as an elastomer matrix) reinforced with a blend of silica (as a reinforcing inorganic filler) and carbon black, and a plasticizing agent comprising a liquid polybutadiene (as a liquid diene polymer), a sunflower oil (as a vegetable oil) and a $C_5/C_9$ hydrocarbon resin (as a hydrocarbon resin). The formulations of the three rubber compositions are given at Table 1 with the content of the various products expressed in phr.

Each rubber composition was produced as follows: The reinforcing filler, its associated coupling agent, the plasticizing agent, the elastomer matrix and the various other ingredients, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulfur and an accelerator of sulfenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting, assembling or both to the desired dimensions, for example as tire semi-finished products, in particular as tire treads.

As the measurement of tear strength, test samples were cut from a cured plaque with a thickness of about 2.5 mm. Notches (perpendicular to the test direction) were created in the samples prior to testing. The force and elongation at break was measured using an Instron 5565 Uniaxial Testing System. The cross-head speed was 500 mm/min. Samples were tested at 23° C. The results are expressed in base 100, that is to say that the value 100 is arbitrarily assigned to the tear strength index being equal to force at rupture (MPa) *elongation at break (%) of each of the references (C-1) or (C-2), and the values of the rubber compositions are shown in Table 1. The higher the value is, the less susceptible is the material to tearing, which is to say that the higher durability is.

Each rubber composition was placed in a press with heated platens at a temperature (typically 160° C.), and for the time that was necessary for the crosslinking of these rubber compositions (typically several tens of minutes), at a pressure (typically 16 bar), and then, that is after curing, tan(δ)max of Each rubber composition was measured on a viscosity analyser (Metravib VA4000), according to the standard ASTM D 5992-96. A recording was made of the response of a sample of vulcanized composition (cylindrical test specimen with a thickness of 4 mm and a cross section of 400 mm²), subjected to a simple alternating sinusoidal shear stress, at the frequency of 10 Hz, under defined temperature conditions, for example at 23° C. according to the standard ASTM D 1349-99. A strain amplitude sweep was carried out from 0.1% to 100% (outward cycle), then from 100% to 1% (return cycle). For the return cycle, the maximum value of tan(δ) observed, identified as tan(δ)max at 23° C., was indicated. The value of tan(δ)max at 23° C. is representative of the hysteresis property, and therefore of the rolling resistance.

The lower $\tan(\delta)_{max}$ at 23° C. is, the better the hysteresis property (relative to rolling resistance) is, therefore, a value $(\tan(\delta)\text{max (C-1)}/\tan(\delta)_{max} \text{(C-n)} \times 100$; where n=1 to 6; or $\tan(\delta)_{max} \text{(C-2)}/\tan(\delta)_{max} \text{(C-n)} \times 100$; where n=1 to 6) greater than that of each of the references (C-1) or (C-2), set at 100, indicates an improved performance.

The results from Table 1 demonstrate that the rubber compositions (C-3 and C-4) according to the invention have an unexpectedly improved balance of performances between the durability and the hysteresis property than that of the reference or the comparative examples (C-1, C-2, C-5 and C-6). The balance between the durability and the hysteresis property in Table 1 is a sum of the both performances.

In conclusion, the rubber composition according to the invention allows an improvement of the balance of performances between the durability and the hysteresis property.

TABLE 1

|  | Ref. | | Examples | | Comparative examples | |
| --- | --- | --- | --- | --- | --- | --- |
|  | C-1 | C-2 | C-3 | C-4 | C-5 | C-6 |
| SBR1 (1) | 70 | 70 | 70 |  | 70 | 70 |
| SBR2 (2) |  |  |  | 70 |  |  |
| BR (3) | 30 | 30 | 30 | 30 | 30 | 30 |
| Carbon black (4) | 4 | 4 | 4 | 4 | 4 | 4 |
| Silica (5) | 165 | 165 | 165 | 165 | 165 | 165 |
| Coupling agent (6) | 13 | 13 | 13 | 13 | 13 | 13 |
| Liquid diene polymer 1 (7) | 10 |  |  |  |  |  |
| Liquid diene polymer 2 (8) |  | 10 |  |  |  |  |
| Liquid diene polymer 3 (9) |  |  | 10 | 10 | 10 | 10 |
| Vegetable oil (10) | 37 | 37 | 37 | 37 | 37 | 3 |
| Hydrocarbon resin (11) | 80 | 80 | 80 | 80 | 10 | 80 |
| ZnO | 3 | 3 | 3 | 3 | 3 | 3 |
| Stearic acid | 3 | 3 | 3 | 3 | 3 | 3 |
| Antiozone wax | 3 | 3 | 3 | 3 | 3 | 3 |
| Antioxidant (12) | 3 | 3 | 3 | 3 | 3 | 3 |
| DPG (13) | 2 | 2 | 2 | 2 | 2 | 2 |
| Sulfur | 2 | 2 | 2 | 2 | 2 | 2 |
| Accelerator (14) | 3 | 3 | 3 | 3 | 3 | 3 |
| Durability (C-1: 100) | 100 | 109 | 119 | 116 | 67 | 92 |
| Tan(δ)$_{max}$ (C-1: 100) | 100 | 103 | 123 | 110 | 117 | 85 |
| Balance of performances (C-1: 200) | 200 | 212 | 242 | 226 | 184 | 177 |
| Durability (C-2: 100) | 92 | 100 | 109 | 106 | 61 | 84 |
| Tan(δ)$_{max}$ (C-2: 100) | 97 | 100 | 119 | 107 | 114 | 83 |
| Balance of performances (C-2: 200) | 189 | 200 | 229 | 213 | 175 | 167 |

(1) SBR1: solution SBR with 16% of styrene unit and 24% of unit 1,2 of the butadiene part ($Tg_{DSC}$=−65° C.) bearing a SiOR function, R being a methyl radical, the SiOR function not located at the ends of the elastomer chain; wherein the silicon atom of the SiOR function is inserted between the carbon-carbon bonds of the elastomer chain; the SBR further bearing a tertiary amine function made of the amine substituted with two methyl radicals; wherein the nitrogen atom of the amine function is not inserted between the carbon-carbon of the elastomer chain, and the SiOR function bears the amine function; the SBR prepared according to a process described in a patent EP 2 285 852 B1;

(2) SBR2: solution SBR with 16% of styrene unit and 24% of unit 1,2 of the butadiene part ($Tg_{DSC}$=−65° C.) bearing a SiOR function, R being a hydrogen atom, the SiOR being dimethylsilanol function at the end of the elastomer chain, the SBR prepared according to a process described in a patent EP 0 778 311 B 1;

(3) BR with 0.3% of 1,2-vinyl; 2.7% of 1,4-trans; 97% of 1,4-cis ($Tg_{DSC}$=−105° C.);
(4) Carbon black (ASTM grade N234 from Cabot);
(5) Silica ("Zeosil 1165MP" from Rhodia (CTAB, BET: about 160 m²/g));
(6) Coupling agent TESPT ("Si69" from Evonik);
(7) Liquid diene polymer 1: non-functionalized liquid polybutadiene ("POLYVEST 130" from EVONIK, number-average molar mass (Mn): 4600 g/mol, $Tg_{DSC}$=−99° C., 1 mol % of 1,2-vinyl, 22 mol % of 1,4-trans, 77 mol % of 1,4-cis);
(8) Liquid diene polymer 2: hydroxyl-terminated liquid polybutadiene produced by free radical polymerization ("POLYVEST HT" from EVONIK, number-average molar mass (Mn): 2900 g/mol, $Tg_{DSC}$=−80° C., 22 mol % of 1,2-vinyl, 58 mol % of 1,4-trans, 20 mol % of 1,4-cis, average functionality: 2.4 (that means that a polybutadiene molecule has average 2.4 hydroxyl groups irrespective its length)));
(9) Liquid diene polymer 3: triethoxysilane-terminated liquid polybutadiene obtained by reacting hydroxyl-terminated polybutadiene produced by free radical polymerization with 3-i socyanatopropyltriethoxysilane ("POLYVEST EP ST-E-100" from EVONIK, number-average molar mass (Mn): 3300 g/mol, $Tg_{DSC}$=−80° C., 22 mol % of 1,2-vinyl, 58 mol % of 1,4-trans, 20 mol % of 1,4-cis, average functionality: 2.5 (that means that a polybutadiene molecule has an average 2.5 silane groups irrespective its length));
(10) Oleic sunflower oil ("Agripure 80" from Cargill, Weight percent oleic acid: 100%);
(11) Hydrocarbon resin $C_5/C_9$ type ("Escorez ECR-373" from Exxon, $Tg_{DSC}$=44° C.);
(12) N-(1,3-dimethylbutyl)-N-phenyl-para-phenylenediamine ("Santoflex 6-PPD" from Flexsys);
(13) Diphenylguanidine ("Perkacit DPG" from Flexsys);
(14) N-dicyclohexyl-2-benzothiazolesulfenamide ("Santocure CBS" from Flexsys).

The invention claimed is:

1. A rubber composition based on at least:
an elastomer matrix;
a reinforcing filler comprising a reinforcing inorganic filler; and
a plasticizing agent comprising a hydrocarbon resin and a liquid plasticizer comprising a vegetable oil and a liquid diene polymer bearing at least one silane function,
wherein the amount in phr of hydrocarbon resin is higher than that of the liquid diene polymer, and
wherein the amount in phr of vegetable oil is higher than one-third of the amount in phr of the liquid diene polymer.

2. The rubber composition according to claim 1, wherein the elastomer matrix comprises at least one first diene elastomer bearing at least one SiOR function, R being hydrogen atom or a hydrocarbon radical.

3. The rubber composition according to claim 2, wherein the at least one first diene elastomer is a styrene-butadiene copolymer.

4. The rubber composition according to claim 1, wherein the amount of the reinforcing inorganic filler is more than 90 phr.

5. The rubber composition according to claim 1, wherein the reinforcing inorganic filler predominately comprises silica.

6. The rubber composition according to claim 1, wherein the reinforcing filler further comprises less than 10 phr of carbon black.

7. The rubber composition according to claim 1, wherein the amount of the liquid diene polymer is at most 25 phr.

8. The rubber composition according to claim 1, wherein the liquid diene polymer has a glass transition temperature of less than −60° C.

9. The rubber composition according to claim 1, wherein the liquid diene polymer has a number average molar mass of less than 6000 g/mol.

10. The rubber composition according to claim 1, wherein the liquid diene polymer comprises 1,3-butadiene derived monomer units being 1,2-vinyl, 1,4-trans and 1,4-cis,
wherein a proportion of 1,2-vinyl in an entirety of the 1,3-butadiene derived monomer units present in the liquid diene polymer is less than 40 mol %, and
wherein a sum of proportions of 1,4-trans and 1,4-cis in the entirety of the 1,3-butadiene derived monomer units present in the liquid diene polymer is more than 60 mol %.

11. The rubber composition according to claim 1, wherein the liquid diene polymer is a liquid polybutadiene.

12. The rubber composition according to claim 1, wherein the amount of the vegetable oil is more than 5 phr.

13. The rubber composition according to claim 1, wherein the vegetable oil is selected from the group consisting of linseed oil, safflower oil, soybean oil, corn oil, cottonseed oil, turnip seed oil, castor oil, tung oil, pine oil, sunflower oil, palm oil, olive oil, coconut oil, groundnut oil, grapeseed oil, and the combinations thereof.

14. The rubber composition according to claim 1, wherein the amount of the hydrocarbon resin is more than 10 phr.

15. The rubber composition according to claim 1, wherein the amount in phr of the hydrocarbon resin is higher than that of the vegetable oil.

16. The rubber composition according to claim 1, wherein the amount in phr of the hydrocarbon resin is higher than the total amount in phr of the vegetable oil and the liquid polymer.

17. The rubber composition according to claim 1, wherein the hydrocarbon resin is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, alpha-methyl styrene homopolymer or copolymer resins, and combinations thereof.

18. A tire tread comprising a rubber composition according to claim 1.

* * * * *